(12) United States Patent
Charters et al.

(10) Patent No.: US 7,421,167 B2
(45) Date of Patent: Sep. 2, 2008

(54) OPTICAL POWER DISTRIBUTION DEVICES

(75) Inventors: Robert B. Charters, Palmerston (AU); Benjamin Cornish, Palmerston (AU)

(73) Assignee: RPO Pty Limited, Eveleigh, New South Wales (AU)

(*) Notice: Subject to any disclaimer, the term of this patent is extended or adjusted under 35 U.S.C. 154(b) by 0 days.

(21) Appl. No.: 11/298,962

(22) Filed: Dec. 9, 2005

(65) Prior Publication Data

US 2006/0188198 A1 Aug. 24, 2006

Related U.S. Application Data

(60) Provisional application No. 60/634,899, filed on Dec. 9, 2004.

(51) Int. Cl.
*G02B 6/26* (2006.01)

(52) U.S. Cl. .......................................... 385/48; 385/39

(58) Field of Classification Search .................. 385/31, 385/39, 42–50, 129, 130
See application file for complete search history.

(56) References Cited

U.S. PATENT DOCUMENTS

| | | | |
|---|---|---|---|
| 3,673,327 A | 6/1972 | Johnson et al. |
| 3,764,813 A | 10/1973 | Clement et al. |
| 3,775,560 A | 11/1973 | Ebeling et al. |
| 3,860,754 A | 1/1975 | Johnson et al. |
| 4,198,623 A | 4/1980 | Misek et al. |
| 4,240,849 A | 12/1980 | Kurokawa et al. |
| 4,243,879 A | 1/1981 | Carroll et al. |
| 4,247,767 A | 1/1981 | O'Brien et al. |
| 4,267,443 A | 5/1981 | Carroll et al. |
| 4,301,447 A | 11/1981 | Funk et al. |
| 4,346,376 A | 8/1982 | Mallos |
| 4,384,201 A | 5/1983 | Carroll et al. |

(Continued)

FOREIGN PATENT DOCUMENTS

GB 2082472 A 3/1982

(Continued)

OTHER PUBLICATIONS

Day, S. et al. (May 7, 1992). "Silicon Based Fibre Pigtailed 1×16 Power Splitter," *Electronics Letters* 28(10):920-922.

(Continued)

*Primary Examiner*—Kevin S Wood
(74) *Attorney, Agent, or Firm*—Miller, Matthias & Hull

(57) ABSTRACT

This invention relates to optical splitters, particularly to optical splitters for use in optical touch screens. The present invention provides an optical splitter for distributing light substantially equally from a multimode input waveguide to an array of output waveguides, via a slab region. The distribution of output waveguide widths is chosen to complement the intensity distribution in the slab region, which may or may not be substantially uniform. The invention also provides an optical splitter for distributing light substantially equally from an optical source to a plurality of waveguides, wherein said optical source directs a beam of light into a slab region. The distribution of waveguide widths is chosen to complement the intensity distribution in the slab region, which may or may not be substantially uniform. When used to distribute optical power in optical touch screens, the splitters of the present invention may be used in series and/or in parallel.

11 Claims, 12 Drawing Sheets

U.S. PATENT DOCUMENTS

| | | |
|---|---|---|
| 4,459,476 A | 7/1984 | Weissmueller et al. |
| 4,484,794 A | 11/1984 | Witte |
| 4,542,375 A | 9/1985 | Alles et al. |
| 4,621,257 A | 11/1986 | Brown |
| 4,636,632 A | 1/1987 | Ando |
| 4,645,920 A | 2/1987 | Carroll et al. |
| 4,670,738 A | 6/1987 | Weinblatt |
| 4,672,195 A | 6/1987 | Golborne et al. |
| 4,672,364 A | 6/1987 | Lucas |
| 4,672,558 A | 6/1987 | Beckes et al. |
| 4,673,918 A | 6/1987 | Adler et al. |
| 4,684,801 A | 8/1987 | Carroll et al. |
| 4,689,446 A | 8/1987 | Hasegawa et al. |
| 4,692,809 A | 9/1987 | Beining et al. |
| 4,695,827 A | 9/1987 | Beining et al. |
| 4,700,176 A | 10/1987 | Adler |
| 4,703,316 A | 10/1987 | Sherbeck |
| 4,707,689 A | 11/1987 | DiPiazza et al. |
| 4,710,759 A | 12/1987 | Fitzgibbon |
| 4,713,534 A | 12/1987 | Masters et al. |
| 4,737,626 A | 4/1988 | Hasegawa |
| 4,737,631 A | 4/1988 | Sasaki et al. |
| 4,737,634 A | 4/1988 | Sasaki et al. |
| 4,742,221 A | 5/1988 | Sasaki et al. |
| 4,751,379 A | 6/1988 | Sasaki et al. |
| 4,761,637 A | 8/1988 | Lucas et al. |
| 4,777,482 A | 10/1988 | Kaneko et al. |
| 4,791,416 A | 12/1988 | Adler |
| 4,811,004 A | 3/1989 | Person et al. |
| 4,812,642 A | 3/1989 | Hasegawa et al. |
| 4,812,830 A | 3/1989 | Doering |
| 4,818,859 A | 4/1989 | Hough |
| 4,821,030 A | 4/1989 | Batson et al. |
| 4,825,212 A | 4/1989 | Adler et al. |
| 4,841,141 A | 6/1989 | Ouchi |
| 4,846,540 A | 7/1989 | Kapon |
| 4,847,606 A | 7/1989 | Beiswenger |
| 4,859,996 A | 8/1989 | Adler et al. |
| 4,868,550 A | 9/1989 | Sasaki et al. |
| 4,868,912 A | 9/1989 | Doering |
| RE33,151 E | 1/1990 | Adler |
| 4,891,508 A | 1/1990 | Campbell |
| 4,893,120 A | 1/1990 | Doering et al. |
| 4,904,042 A | 2/1990 | Dragone |
| 4,905,174 A | 2/1990 | Ouchi |
| 4,916,308 A | 4/1990 | Meadows |
| 4,928,094 A | 5/1990 | Smith |
| 4,933,544 A | 6/1990 | Tamaru |
| 4,936,683 A | 6/1990 | Purcell |
| 4,943,806 A | 7/1990 | Masters et al. |
| 4,986,662 A | 1/1991 | Bures |
| 4,998,014 A | 3/1991 | Hasegawa |
| 5,003,505 A | 3/1991 | McClelland |
| 5,025,411 A | 6/1991 | Tallman et al. |
| 5,051,574 A | 9/1991 | Yoshida et al. |
| 5,055,840 A | 10/1991 | Bartlett |
| 5,107,253 A | 4/1992 | Meadows |
| 5,146,081 A | 9/1992 | Heikkinen et al. |
| 5,162,783 A | 11/1992 | Moreno |
| 5,170,448 A | 12/1992 | Ackley et al. |
| 5,179,369 A | 1/1993 | Person et al. |
| 5,194,863 A | 3/1993 | Barker et al. |
| 5,196,836 A | 3/1993 | Williams |
| 5,355,149 A | 10/1994 | Casebolt |
| 5,414,413 A | 5/1995 | Tamaru et al. |
| 5,635,724 A | 6/1997 | Higgins et al. |
| 5,764,223 A | 6/1998 | Chang et al. |
| 5,841,919 A | 11/1998 | Akiba et al. |
| 5,914,709 A | 6/1999 | Graham et al. |
| 6,021,243 A | 2/2000 | Fasanella et al. |
| 6,181,842 B1 | 1/2001 | Francis et al. |
| 6,278,443 B1 | 8/2001 | Amro et al. |
| 6,351,260 B1 | 2/2002 | Graham et al. |
| 6,429,857 B1 | 8/2002 | Masters et al. |
| 6,480,187 B1 | 11/2002 | Sano et al. |
| 6,492,633 B2 | 12/2002 | Nakazawa et al. |
| 6,495,832 B1 | 12/2002 | Kirby |
| 6,577,799 B1 | 6/2003 | Charters et al. |
| 6,677,934 B1 | 1/2004 | Blanchard |
| 6,690,363 B2 | 2/2004 | Newton |
| 6,707,448 B1 | 3/2004 | Kunimatsu et al. |
| 6,800,724 B2 | 10/2004 | Zha et al. |
| 6,818,721 B2 | 11/2004 | Zha et al. |
| 6,864,882 B2 | 3/2005 | Newton |
| 6,892,008 B2 * | 5/2005 | Singh et al. .................. 385/49 |
| 6,965,006 B2 | 11/2005 | Zha |
| 2002/0088930 A1 | 7/2002 | Graham et al. |
| 2004/0201579 A1 | 10/2004 | Graham |

FOREIGN PATENT DOCUMENTS

| | | |
|---|---|---|
| JP | 61-38335 A | 5/1994 |

OTHER PUBLICATIONS

International Search Report for PCT Application No. PCT/AU2005/001868 filed Dec. 9, 2005, mailed Feb. 21, 2006, five pages.

Soldano, L.B. et al. (Apr. 1995). "Optical Multi-Mode Interference Devices Based on Self-Imaging: Principles and Applications," *Journal of Lightwave Technology* 13(4):615-627.

* cited by examiner

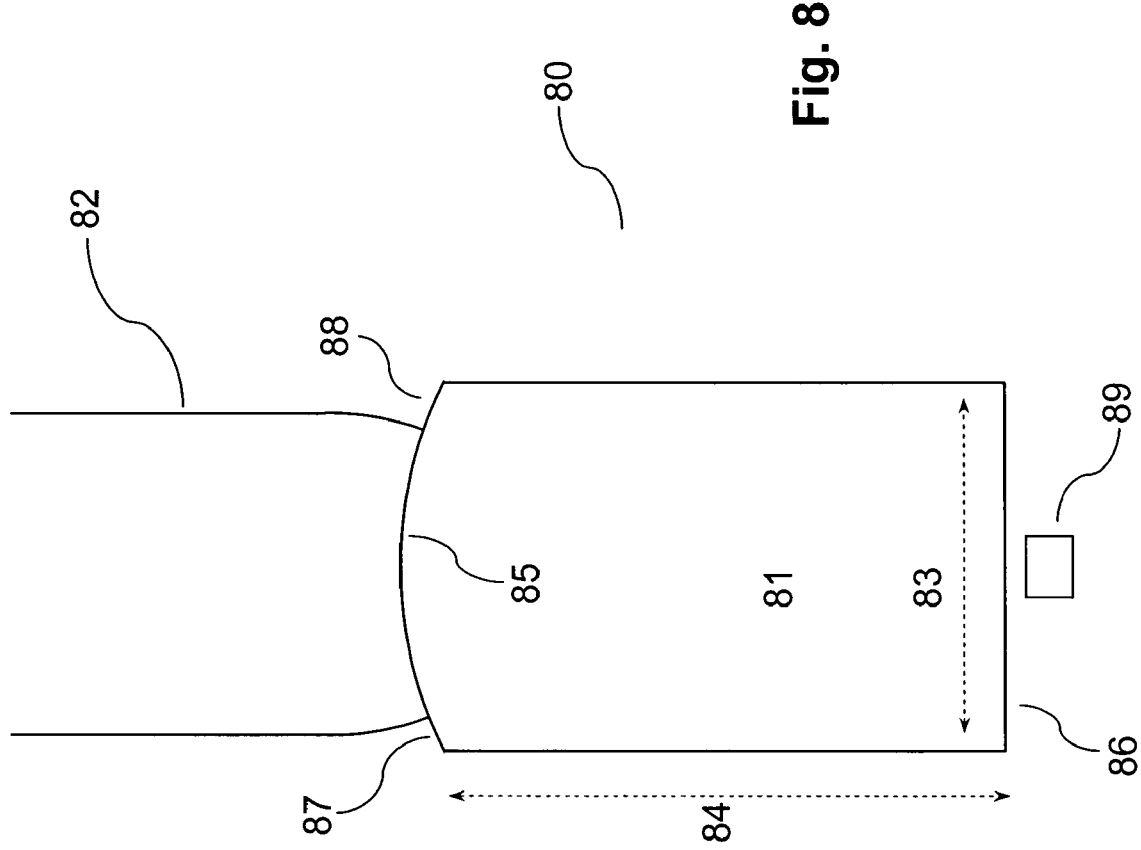

OPTICAL POWER DISTRIBUTION DEVICES

CROSS REFERENCE TO RELATED APPLICATIONS

The present application is related and claims priority to U.S. Provisional Patent Application Ser. No. 60/634,899, filed Dec. 9, 2004. The disclosure of which is herein incorporated by reference in its entirety.

FIELD OF THE INVENTION

This invention relates to optical power splitters. The invention has particular application in relation to optical power splitters for use in optical touch screens and will be described herein in relation to this application.

BACKGROUND TO THE INVENTION

Any discussion of the prior art throughout the specification should in no way be considered as an admission that such prior art is widely known or forms part of common general knowledge in the field.

U.S. Pat. Nos. 5,914,709, 6,181,842 and 6,351,260, and U.S. Patent Application Nos. 2002/0088930 A1 and 2004/0201579 A1 (the contents of which are incorporated into this specification by way of cross-reference), describe an optical touch screen sensor in which planar optical waveguides are used to launch an array of light beams across a screen, then collect them at the other side of the screen and conduct them to a position-sensitive detector. The touch screens are usually two dimensional, with two arrays (X, Y) of send waveguides along adjacent sides of the screen, and two corresponding arrays of receive waveguides along the other two sides of the screen. As part of the "transmit side", in one embodiment a single optical source launches light into a plurality of waveguides that form both the X and Y send arrays. In another embodiment, the X and Y send arrays each receive light from a separate optical source. U.S. Patent Application No. 2004/0201579 teaches that the light beams launched across the screen preferably form a "lamina" (i.e. a thin sheet) of light of substantially uniform intensity. This minimises the required dynamic range of the photodetectors associated with the X, Y receive arrays, and enhances the grey scale interpolation of the position sensing algorithms. Accordingly, with either the single or dual optical source embodiment, it is preferable to have equal 1×N splitting of power from the optical source into the corresponding array of N waveguides. It will be appreciated that the spatial resolution of this type of optical touch screen is determined by the number of beams traversing the screen, which corresponds to the number of waveguides in the transmit and receive arrays. However since the waveguide arrays need to fit within the bezel of the screen, there is only room for a limited number of waveguides within each array, representing a limitation of waveguide-based optical touch screens.

Optical waveguides that confine light in two dimensions (such as optical fibres or channel waveguides) may be either singlemode or multimode. In singlemode waveguides, optical power propagates in a single, well defined mode with an intensity profile that is approximately Gaussian in shape. Although this is an approximation, it is mathematically convenient and frequently used when modelling optical waveguides. Hereinafter, the intensity profile of light in a singlemode optical waveguide will be referred to as Gaussian in shape. As shown in FIG. 1, if the confinement in one dimension is lifted when a singlemode channel waveguide 10 joins a slab region 11, the Gaussian mode 12 diffracts in the unconstrained dimension to produce an expanding wavefront 13 that maintains a Gaussian intensity profile. In multimode waveguides on the other hand, optical power propagates in at least two, more often many, modes, with an overall intensity profile that is more complicated than a simple Gaussian. Upon entering a slab region, the optical power diffracts into a wavefront that is non-Gaussian in shape.

Integrated optical devices capable of equal 1×N splitting of optical power are known for the case of singlemode waveguides. One class of such devices known in the art are multimode interference splitters, commonly known as MMI splitters (L. B. Soldano and E. C. M. Pennings, IEEE Journal of Lightwave Technology vol. 13 No. 4, pp. 615-627, April 1995). As shown in FIG. 2 for the specific 1×4 case, a 1×N MMI splitter 20 comprises a singlemode input waveguide 21, a multimode section 22 and N singlemode output waveguides 23. N is generally a multiple of two, and for equal splitting the input waveguide should be centrally located on the input face of the multimode region and the output waveguides evenly spaced along the output face. By correctly choosing the width and length of the multimode section 22, the light emanating from the input waveguide 21 is "self-imaged" to form N images at the entrances to the output waveguides. Although in theory N can be any multiple of two, practical considerations such as device length and fabrication tolerances limit MMI splitters to low port counts such as 1×2, 1×4 or 1×8. Furthermore, because MMI devices rely on interference effects to produce well defined self-images, they are only applicable to singlemode inputs.

Equal 1×N splitting with much higher port counts, or for port counts that are not a multiple of two, can be achieved with a "tree" splitter comprising an input waveguide, a diffractive slab region and N output waveguides, where the output waveguides are generally located on a circular arc centred on the input waveguide. A 1×8 tree splitter 30 is illustrated schematically in FIG. 3, where a singlemode input waveguide 31 launches a Gaussian beam 32 into a slab region 33. This beam diffracts as it propagates through the slab region, producing an expanding Gaussian wavefront 34 that impinges on and is coupled into an array 35 of output waveguides. Since the amount of light coupled into each output waveguide depends approximately on the optical field integrated over the cross sectional area of the waveguide, equal power splitting is achieved when the width of the waveguides increases progressively away from the centre (where the Gaussian profile is peaked). 1×N splitters of this type are disclosed by S. Day et al. "Silicon based fibre pigtailed 1×16 power splitter", Electronics Letters vol. 28 No. 10, pp. 920-922, 7th May 1992, and in Japanese patent application No. JP6138335A2. Note that for ease of fabrication, the output waveguides (and the slab region) are constrained to have equal height, so to adjust the cross sectional area for the overlap integral, the width needs to be varied. Note also that to maximise the amount of light coupled into the output waveguides, the gaps 36 between the output waveguides should be made as small as possible. However because any given fabrication technique has a resolution limit (i.e. the smallest structures that can be patterned), these gaps generally cannot be made arbitrarily small.

1×N tree splitters are a special case of M×N star couplers, also well known in the art (see for example U.S. Pat. No. 4,904,042), where M input waveguides and N output waveguides are located on opposite sides of a diffractive slab region. The input and output waveguides are generally singlemode, although tree splitters and star couplers with multimode waveguides are also known in the art (see for example U.S. Pat. Nos. 4,484,794 and 6,021,243). However in known multimode waveguide star couplers, the input and/or output waveguides are invariably uniform in width, with no attempt made to tailor the distribution of widths to match a certain intensity profile in the slab region. For highly multimode waveguides supporting hundreds or possibly thousands of modes, this approach is acceptable because the wavefront diffracting into the slab region from a highly multimode input waveguide will be more or less uniform in intensity, resulting in more or less equal splitting into an array of identical output waveguides.

There is another regime, which can be termed few-moded waveguides, situated between single mode and highly multimode waveguides that support in the order of two to a few tens of modes. In the case of a few-moded input waveguide, the diffracting wavefront in the slab region will have a non-Gaussian intensity profile that may nevertheless be well-defined, and to achieve equal splitting, the output waveguide widths should preferably follow a corresponding "inverse" or "complementary" profile. For waveguide-based optical touch screens of the prior art, various aspects of system design mean that multimode or few-moded waveguides are preferred. However to the best of our knowledge, no devices for achieving equal 1×N splitting of optical power from a few-moded input waveguide are known in the art. Accordingly, it would be desirable to provide an integrated optic 1×N splitter that achieves substantially equal splitting of a non-Gaussian beam launched from an input waveguide into a slab region by appropriately tailoring the widths of the output waveguides. It would be further desirable to provide, in a waveguide-based optical touch screen sensor, an integrated optic 1×N splitter that achieves substantially equal 1×N power splitting of light from a single input waveguide.

The above discussion has dealt with devices for 1×N splitting where light enters the slab region from an input waveguide. A different situation arises if the input waveguide is dispensed with, and light launched directly into the slab from an optical source. To achieve equal 1×N splitting of optical power, the distribution of output waveguide widths may still need to be tailored such that, for a particular intensity distribution of light diffracting in the slab region, the overlap integral of the optical field and waveguide cross-sectional area is equal for each output waveguide. Accordingly, it would be desirable to provide an integrated optic 1×N splitter that achieves substantially equal splitting of a non-Gaussian beam launched from an optical source into a slab region by appropriately tailoring the widths of the output waveguides. It would be further desirable to provide, in a waveguide-based optical touch screen sensor, an integrated optic 1×N splitter that achieves substantially equal 1×N power splitting of light launched directly from an optical source into a slab region.

A particularly favourable situation arises if light can be launched into the slab region such that it excites a substantially uniform or "top hat" intensity distribution, as the output waveguides can then have equal widths. It would be therefore desirable to provide a means of achieving substantially equal 1×N splitting of optical power by directly exciting a substantially uniform intensity distribution in a slab region with an appropriate optical source.

If equal intensity splitting is required with a 1×N tree splitter, then it is impossible for all the power to be captured, irrespective of the particular intensity distribution (i.e. Gaussian or otherwise). This is because every physical intensity distribution tails off to infinity, and if each output waveguide were to receive 1/N of the input power, then the outermost output waveguides would need to have infinite width. This is generally not practical, so the outer edges of the intensity distribution have to be neglected or discarded. This is ensured by designing the slab region to be wider than the array of output waveguides connected thereto (i.e. where they connect to the slab region), so that the outer edges of the intensity distribution fall outside the waveguide array. Equivalently, the (generally curved) end face of the slab region is longer than the sum of the output waveguide widths and intervening gaps. This is known in the art for the singlemode case, as noted in JP6138335A2 (tree splitters) and U.S. Pat. No. 4,904,042 (star couplers). However to the best of our knowledge, such devices with multimode waveguides are routinely designed such that the input and/or output waveguides completely fill the slab apertures (see for example U.S. Pat. Nos. 4,484,794 and 6,021,243). Again this will be generally acceptable for highly multimode waveguides where the wavefront diffracting into the slab region will be more or less uniform in intensity with minimal power in the tails. In the case of a few-moded input waveguide however, the diffracting wavefront in the slab region may have a non-Gaussian but still well defined intensity profile, with significant power in the tails that will have to be discarded for equal splitting. Similarly to the singlemode case, this can be done by designing the slab region to be wider than the array of output waveguides connected thereto. A second benefit of such a design is that it prevents any reflections of the diffracting wavefront off the slab region side walls. These reflections can interfere with the main diffracted beam causing interferometric peaks and troughs in intensity, resulting in speckle in the power distribution at the end of the slab region on a length scale comparable to the waveguide dimensions. In the 1×N tree splitters of the present invention, it is therefore preferable that the diffractive slab region be wider than the array of output waveguides connected thereto.

It is an object of the present invention to overcome or ameliorate at least one of the disadvantages of the prior art, or to provide a useful alternative.

SUMMARY OF THE INVENTION

To this end, a first aspect of the present invention provides, as a component of an optical touch screen sensor, an optical power splitter for distributing light substantially equally from an optical source to an array of output waveguides. The optical power splitter comprises a slab region with a multimode input waveguide connected to one end of the slab region and an array of output waveguides connected to the opposite end of the slab region. The optical source directs light into the multimode input waveguide. Preferably the optical source is a light emitting diode or a laser such as a laser diode or a vertical cavity surface emitting laser. Alternatively the optical source is a supplementary waveguide such as an optical fibre or an integrated optical waveguide. Preferably the output waveguides are connected to the slab region along an arc of a circle, and point towards the junction of the input waveguide and the slab region. Preferably the output waveguides are multimode. Alternatively, the output waveguides are singlemode. Preferably, the slab region is wider than the array of output waveguides connected thereto.

A second aspect of the present invention provides, as a component of an optical touch screen sensor, an optical power splitter for distributing light substantially equally from an optical source to a plurality of output waveguides, wherein said optical source directs a beam of light into a slab region whereupon said beam diffracts before being received by said plurality of output waveguides. Preferably the output waveguides are connected to the slab region along an arc of a circle, and point towards the position where light from said optical source enters said slab region. Preferably, the output waveguides are multimode. Alternatively, the output waveguides are singlemode. Preferably, the slab region is wider than the array of output waveguides connected thereto. Preferably the optical source is a light emitting diode or a laser such as a laser diode or a vertical cavity surface emitting laser. Alternatively the optical source is a supplementary waveguide such as an optical fibre or an integrated optical waveguide.

A third aspect of the present invention provides an optical power splitter for distributing light substantially equally from an optical source to an array of output waveguides wherein the output waveguides do not all have the same width. The optical power splitter comprises a slab region with a multimode input waveguide connected to one end of the slab region and an array of output waveguides connected to the opposite end of the slab region. The optical source directs light into the multimode input waveguide. Preferably the optical source is a light emitting diode or a laser such as a laser diode or a vertical cavity surface emitting laser. Alternatively the optical source is a supplementary waveguide such as an optical fibre or an integrated optical waveguide. Preferably, the slab region is wider than the array of output waveguides connected thereto. Preferably the output waveguides are connected to the slab region along an arc of a circle, and point towards the junction of the input waveguide and the slab region. Preferably, the output waveguides are multimode. Alternatively, the output waveguides are singlemode. Preferably, the optical power splitter is a component of an optical touch screen sensor.

A fourth aspect of the present invention provides an optical power splitter for distributing light substantially equally from an optical source to a plurality of output waveguides, wherein said optical source directs a beam of light into a slab region whereupon said beam diffracts with a multi-peaked intensity distribution, said diffracted beam being received by said plurality of output waveguides, where the distribution of output waveguide widths is non-uniform and tailored such that an equal amount of power is coupled into each output waveguide. Preferably the output waveguides are connected to the slab region along an arc of a circle, and point towards the position where light from said optical source enters said slab region. Preferably the optical source is a light emitting diode or a laser such as a laser diode or a vertical cavity surface emitting laser. Alternatively the optical source is a supplementary waveguide such as an optical fibre or an integrated optical waveguide. Preferably, the slab region is wider than the array of output waveguides connected thereto. Preferably, the output waveguides are multimode. Alternatively, the output waveguides are singlemode. Preferably, the optical power splitter is a component of an optical touch screen sensor.

A fifth aspect of the present invention provides an optical power splitter for distributing light substantially equally from an optical source to a plurality of output waveguides wherein said optical source directs a beam of light into a slab region whereupon said beam diffracts with an intensity distribution that is substantially uniform in the plane of the slab region, said diffracted beam being received by said plurality of output waveguides. Preferably the beam is annular in shape. Preferably the optical source is a light emitting diode or a laser such as a laser diode or a vertical cavity surface emitting laser. Alternatively the optical source is a supplementary waveguide with an annular core, such as an optical fibre or an integrated optical waveguide. Preferably the waveguides have uniform widths. Preferably, the slab region is wider than the array of output waveguides connected thereto. Preferably, the output waveguides are multimode. Alternatively, the output waveguides are singlemode. Preferably, the optical power splitter is a component of an optical touch screen sensor.

Within a waveguide-based optical touch screen sensor, optical power splitters according to any of the above aspects may be used in combination, for example in series or in parallel. For example, the transmit side of a waveguide-based optical touch screen may comprise a multi-stage splitting system comprising: a first stage of splitting wherein an optical source such as a laser diode launches light directly into an optical power splitter according to the second, fourth or fifth aspect, which distributes the light to M waveguides; and a second stage of splitting wherein each of the M waveguides feeds into an optical power splitter with N output waveguides according to the first or third aspect, resulting in an M*N splitting of the optical power. These M waveguides can be considered to be supplementary waveguides that act as the optical sources for the second stage of splitting.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

BRIEF DESCRIPTION OF DRAWINGS

The invention will now be described, by way of example only, with reference to the accompanying drawings in which:

FIG. 8 is a schematic illustration of a 1×120 optical power splitter for use in a waveguide-based optical touch screen sensor according to the second aspect of the present invention;

DETAILED DESCRIPTION OF THE INVENTION

Many optical touch screen sensors known in the art determine a touch location via the interruption of one or more beams of light (usually infrared) established in front of a display. Most optical touch screens of this type, disclosed for example in U.S. Pat. Nos. 3,764,813, 4,243,879 and 4,692,809, require a large number of optical sources to generate the beams, and consequently have an undesirably high component cost. In comparison, the waveguide-based optical touch screens described above use waveguides to distribute the optical beams, and require only one or two optical sources, representing a significant cost saving. Because they have only a small number of sources, these touch screens also require some means for distributing the optical power to the waveguides, preferably in a substantially uniform manner. For a typical optical touch screen, the number of waveguides on the transmit side will be of order 100, with a corresponding number on the receive side. For example, a 210 mm×280 mm display equipped with a waveguide-based optical touch sensor with 5 mm resolution would require ((210/5−1)+(280/5−1))=96 transmit waveguides, and clearly many more would be required if better resolution were necessary.

Those skilled in the art of integrated optical waveguides will know that the task of achieving a substantially uniform distribution of optical power into N integrated optical waveguides, with large N (of order 100), is best done with a 1×N "tree splitter" comprising in simplest form an input waveguide, a diffractive slab region, and N output waveguides. A 1×N tree splitter is a special case of an M×N "star coupler", also known in the art, where M input waveguides and N output waveguides are located on opposite sides of a diffractive slab region. Tree splitters and star couplers are known in the art of integrated optical waveguides, both for singlemode waveguides (S. Day et al. "Silicon based fibre pigtailed 1×16 power splitter", Electronics Letters vol. 28 No. 10, pp. 920-922, 7th May 1992; JP6138335A2) and multimode waveguides (U.S. Pat. Nos. 4,484,794 and 6,021,243), but have hitherto not been applied to the problem of optical power distribution in waveguide-based optical touch screen sensors.

Figure 1:
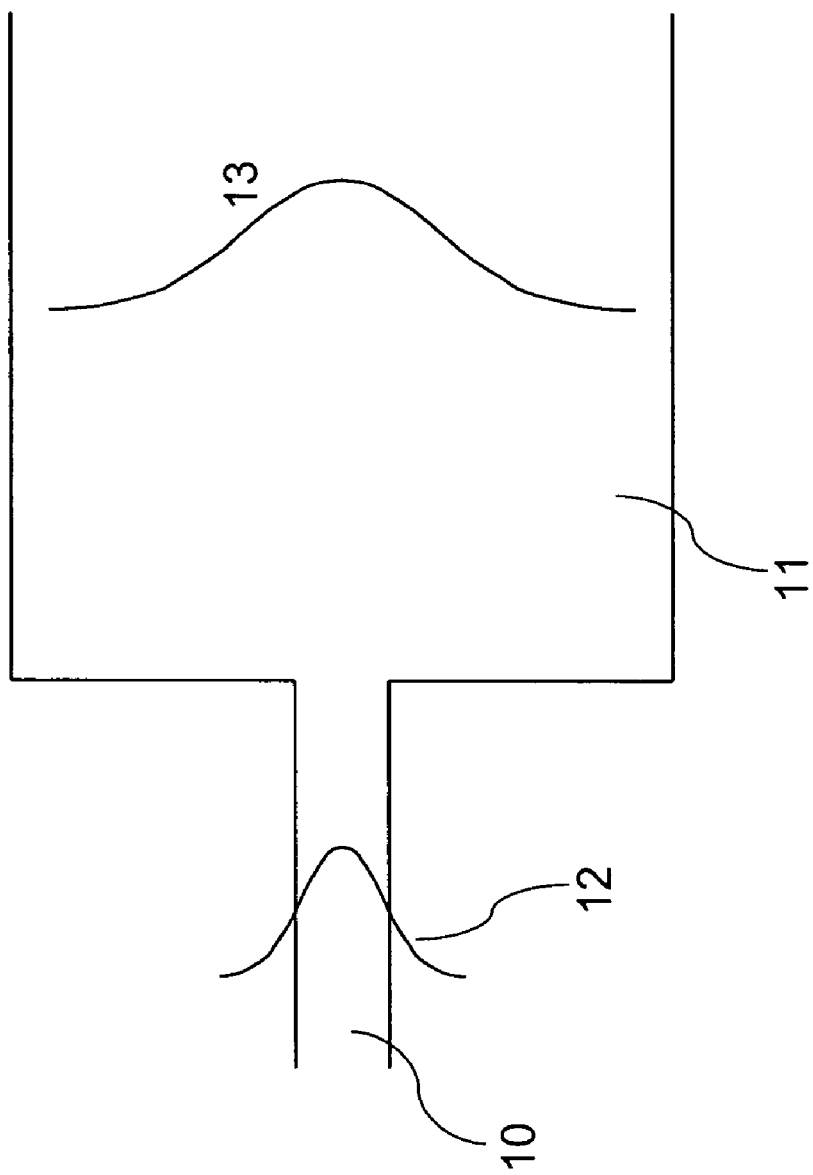
FIG. 1 shows the diffraction of a Gaussian beam as it propagates from a singlemode waveguide into a slab region.
Figure 2:
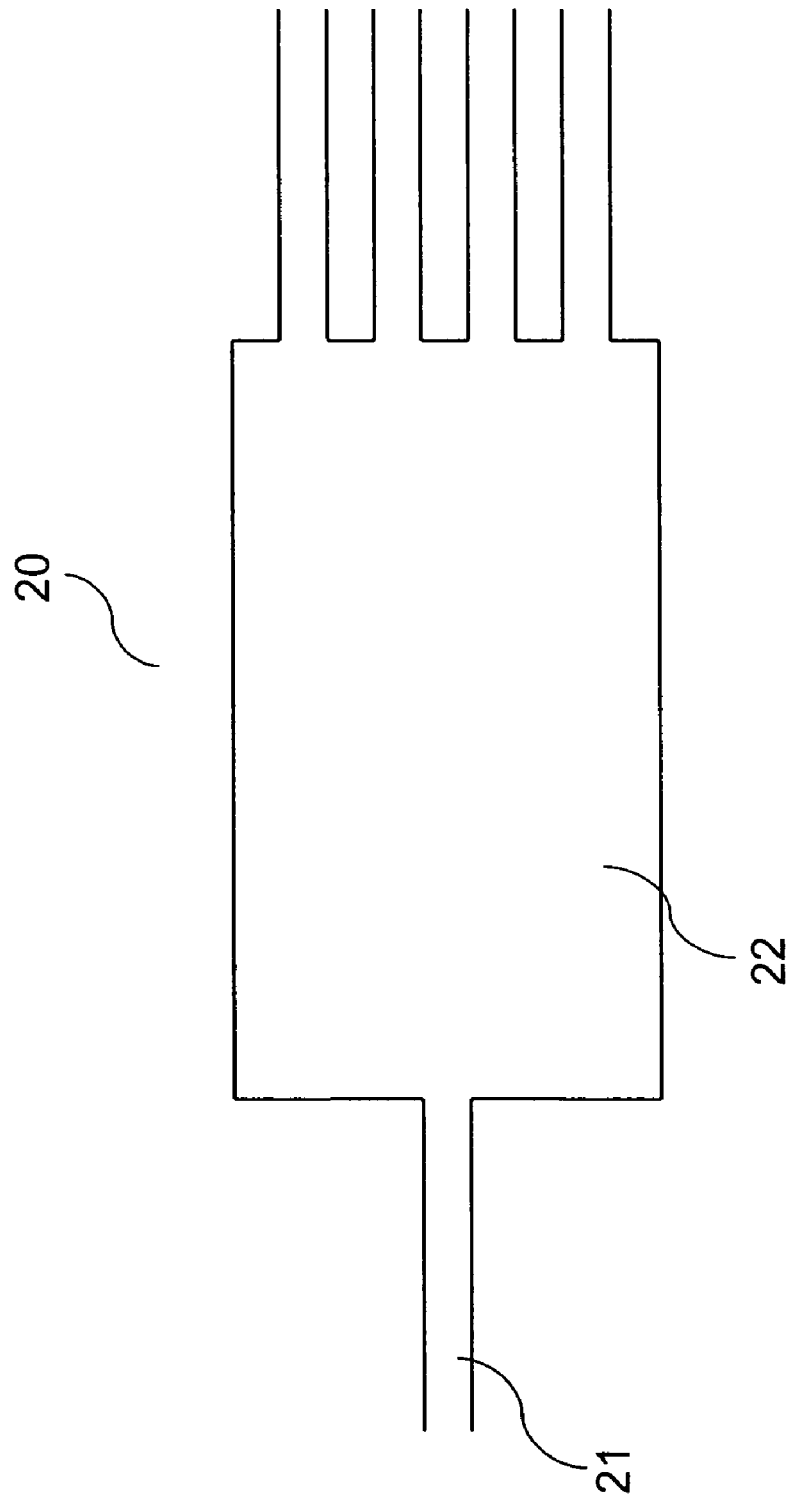
FIG. 2 shows a known 1×4 multimode interference (MMI) splitter.
Figure 3:
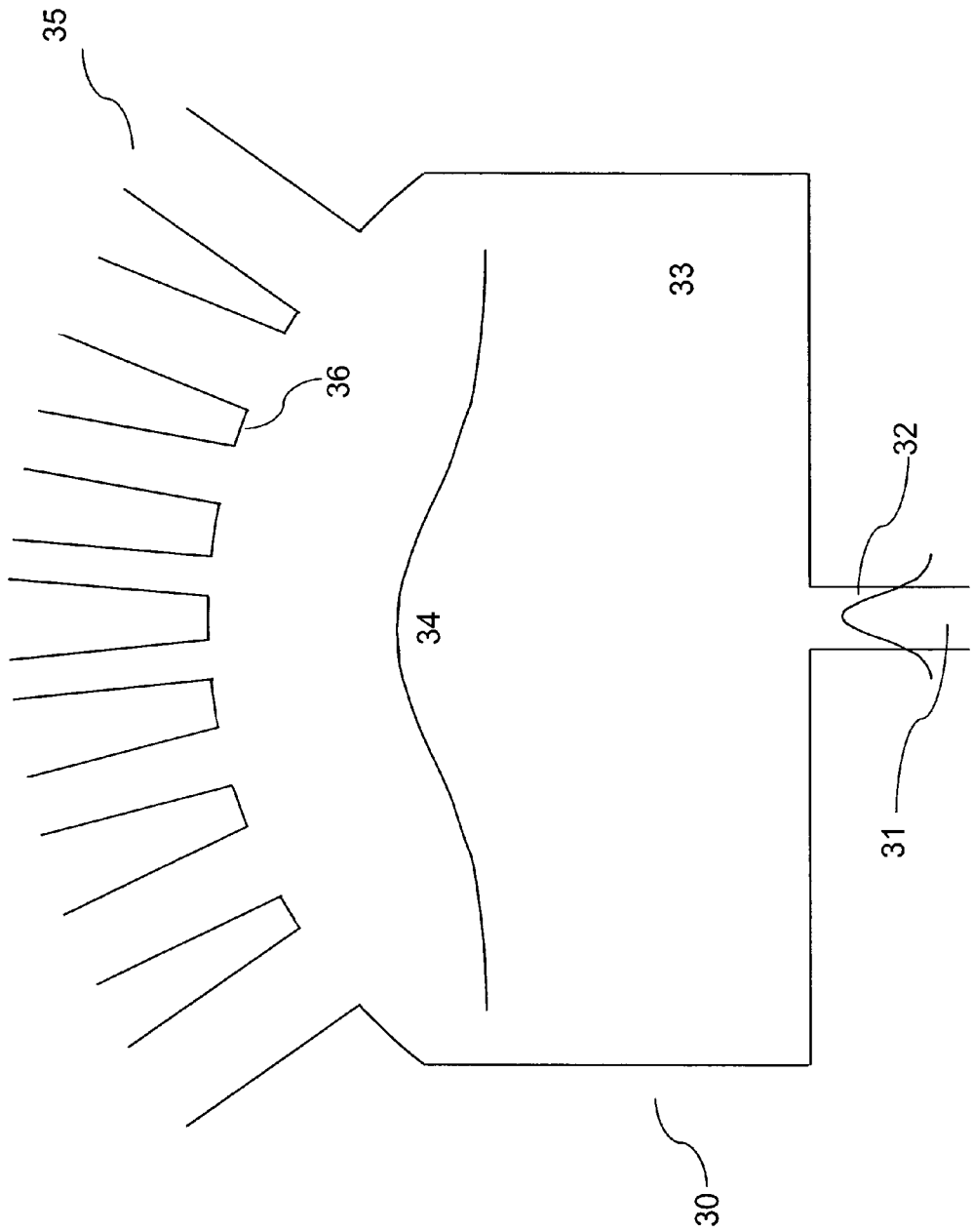
FIG. 3 is a schematic illustration of a known singlemode 1×N splitter for equal splitting as described in JP6138335A2.

Accordingly, a first aspect of the present invention provides an optical power splitter for distributing light substantially equally from an input waveguide to an array of output waveguides in an optical touch screen sensor. As known in the prior art, for substantially uniform splitting it is preferable for the optical power splitter to be designed such that the output waveguides are connected to the slab region along an arc of a circle, and point towards the junction of the input waveguide and the slab region, as shown in FIG. 3. Note that the optical power splitter shown in FIG. 3 is designed specifically for a singlemode input waveguide, with the output waveguide widths tailored to complement the intensity distribution 34 in slab region 33. However for the multimode waveguides generally used in optical touch screen sensors, such an arrangement of output waveguide widths would be inappropriate. To a reasonable approximation, substantially equal splitting of optical power from a multimode input waveguide can be achieved simply with a uniform arrangement of output widths. This "equal width" situation is simple to implement in terms of design and fabrication, and the "equal splitting" approximation will generally improve as the number of supported optical modes in the input waveguide increases.

Figure 4:
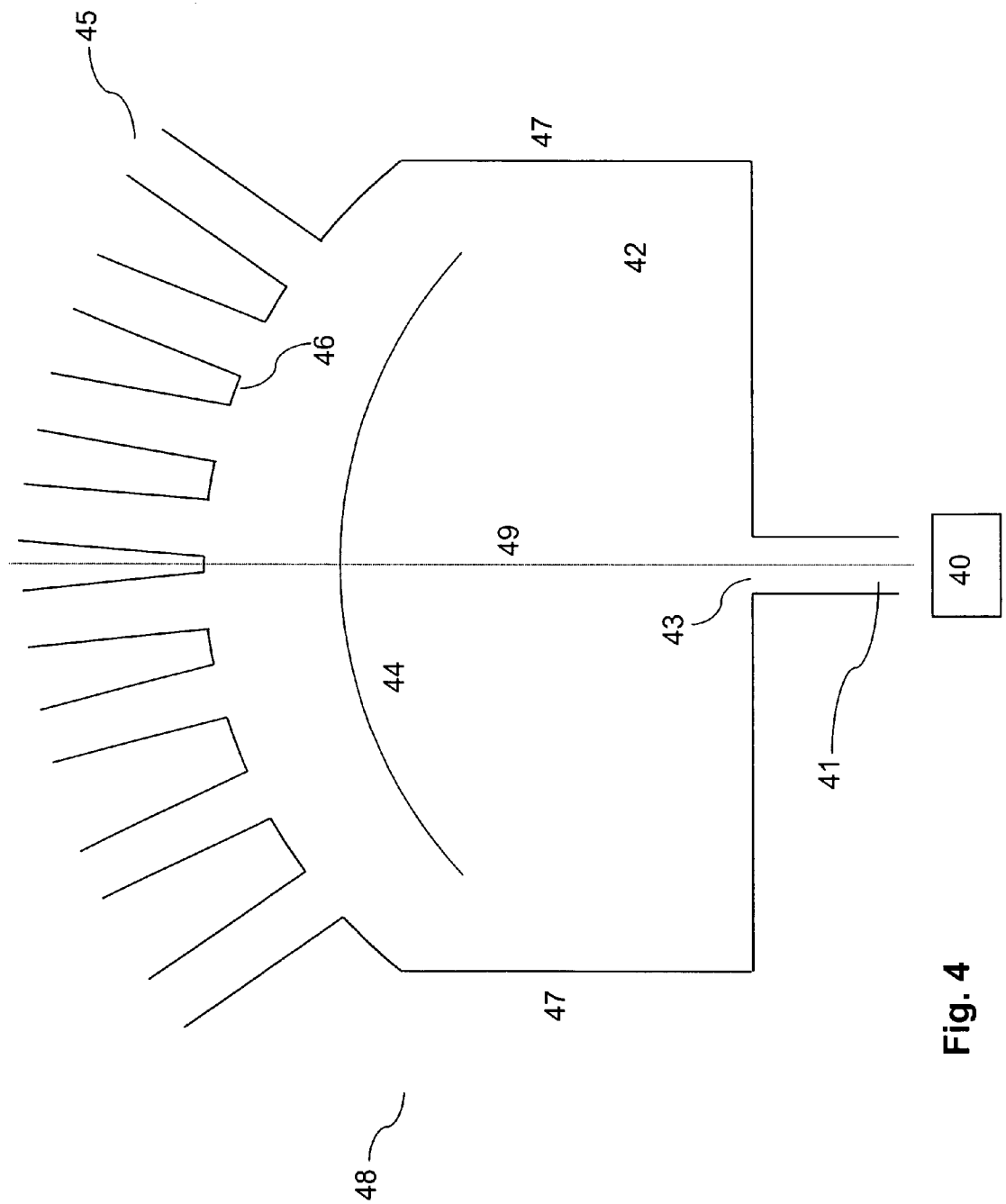
FIG. 4 shows the use of an optical power splitter for power distribution at the launch end of a waveguide-based optical touch screen sensor.

As illustrated in FIG. 4, one application of the optical power splitter according to the first aspect of the invention is at the launch end of a waveguide-based optical touch screen sensor, where light from an optical source 40 such as a laser diode, LED or VCSEL is coupled into a multimode input waveguide 41 and thence into a slab region 42 at position 43. Depending on the number of modes supported by multimode input waveguide 41, the optical field will expand in slab region 42 with a more or less uniform intensity distribution on a spherical wavefront 44. The expanding wavefront 44 then encounters a plurality of output waveguides 45 of equal width, arranged along an arc of a circle centred at position 43, and all pointing towards position 43. Output waveguides 45 may be singlemode or multimode, but for the present application they are preferably multimode. Although the number of output waveguides is only eight in FIG. 4, for the present application there will generally be a much larger number of output waveguides, of order 100. To maximise the amount of light coupled into output waveguides 45, it will be understood that the gaps 46 between the output waveguides should be made as small as possible, within the limits of the fabrication process. Preferably, slab region 42 should be wider than the array of output waveguides 45 connected thereto, and sufficiently wide such that expanding wavefront 44 does not encounter sidewalls 47. This is to prevent any reflections off the sidewalls that may interfere with and affect the uniformity of the power distribution. It will be appreciated by those skilled in the art that the optical power splitter 48 comprising multimode input waveguide 41, slab region 42 and output waveguides 45 will generally be supported on a substrate, not shown in FIG. 4. Preferably, multimode input waveguide 41, slab region 42 and array of output waveguides 45 of optical power splitter 48 share a common axis of symmetry 49.

Figure 5:
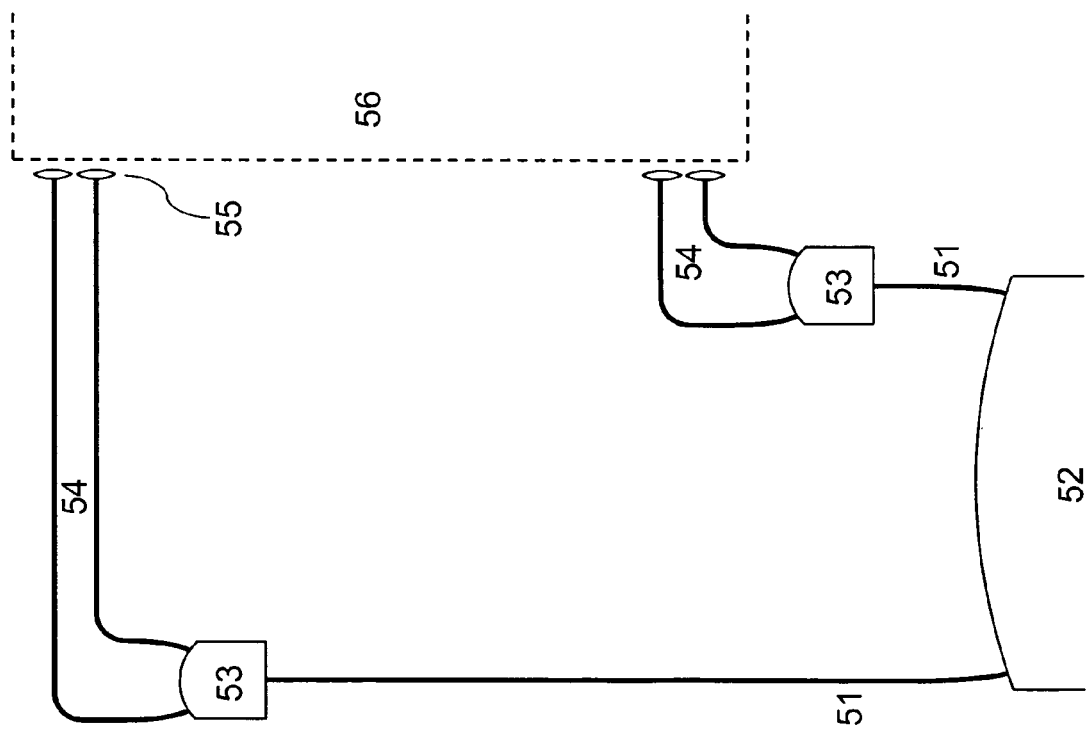
FIG. 5 illustrates a scheme for overcoming a limitation to the spatial resolution of a waveguide-based optical touch screen sensor, using a second stage of optical power splitting.

A second application of the optical power splitter according to the first aspect of the invention is to provide a second stage of optical power distribution on the transmit side of a waveguide-based optical touch screen sensor. As mentioned above, a limitation with waveguide-based optical touch screen sensors of the prior art is that the spatial resolution is limited by the number of waveguides that can be fitted within the bezel of the screen. As illustrated schematically in FIG. 5, this limitation can be overcome by using a second stage of splitting. FIG. 5 shows an array of output waveguides (represented by the two outermost waveguides 51) from the first (launch) stage optical power splitter 52, each feeding into a 1×2 optical power splitter 53 that provides a second stage of splitting. The output waveguides 54 from the 1×2 splitters 53 then feed into launch optics 55 along the edge(s) of the screen 56. The details of launch optics 55 are not particularly important for the purposes of the present invention, but may comprise a diffractive slab region with a convex end face to produce the touch sensing beams, as in the prior art. Alternatively, the launch optics may comprise additional lenses as disclosed in U.S. provisional patent application No. 60/622186 or reflective optics as disclosed in U.S. provisional patent application No. 60/650790. Of crucial importance here is that by means of careful and non-obvious waveguide layout design, the number of touch sensing beams can be increased with little or no increase in the overall width of the transmit side waveguide array, thereby overcoming the spatial resolution limitation. For example, the second stage 1×2 splitters shown in FIG. 5 effectively double the spatial resolution of the associated optical touch screen. Similarly, the spatial resolution could be tripled or quadrupled by using second stage 1×3 or 1×4 tree splitters.

An advantageous aspect of the basic 1×N tree splitter design is that it is applicable to a wide range of N, from values as small as two up to values as large as 100 or more. Accordingly, the second stage 1×N tree splitters will have the same design features as described above for the first stage splitter, except for a different value of N.

It should be understood that further stages of optical power splitting beyond two are also within the scope of the invention.

In the first stage power distribution splitter shown in FIG. 4, the multimode input waveguide 41 is not strictly necessary, and may omitted so that optical source 40 launches light directly into slab region 42. Accordingly, a second aspect of the present invention provides, as a component of an optical touch screen sensor, an optical power splitter for distributing light substantially equally from an optical source to a plurality of output waveguides, wherein said optical source directs a beam of light into a slab region whereupon said beam diffracts before being received by said plurality of output waveguides. Apart from the omission of input waveguide 41, this optical power splitter according to the second aspect of the present invention is identical to the optical power splitter according to the first aspect of the present invention. This arrangement may be advantageous during assembly of an optical touch screen sensor, since it relaxes the tolerance on the placement of the optical source with respect to the splitter, at least in the plane of slab region 42. However it is still preferable for optical source 40 to be positioned approximately on axis of symmetry 49 of the splitter. The optical source may be an emitter such as a light emitting diode or a laser diode, or it may be a supplementary waveguide such as an optical fibre or integrated optical waveguide in close proximity to but physically separate from (i.e. not integral with) the slab region.

As described above, optical power splitters comprising an input waveguide, a slab region and an array of output waveguides, and designed for equal splitting, are known in the art for singlemode input waveguides and for highly multimode input waveguides. With singlemode input waveguides, equal splitting is achieved by tailoring the output waveguide widths to complement the (approximately Gaussian) intensity profile of the wavefront expanding in the slab region. With highly multimode waveguides on the other hand, equal splitting can be achieved simply with uniform output waveguide widths, assuming that the expanding wavefront is approximately uniform in intensity. However for multimode input waveguides supporting only a few optical modes, the wavefront expanding in the diffractive slab region may have a significantly non-uniform intensity distribution, such that equal power splitting will not be achieved simply with uniform output waveguide widths. The wavefront may nevertheless have a well-defined intensity distribution, such as the double-peaked shape shown in FIG. 6, and equal power splitting may still be obtained by appropriately tailoring the output waveguide widths.

Similarly, many optical sources, such as light emitting diodes, high power laser diodes and vertical cavity surface emitting lasers (VCSELs), do not have a simple Gaussian emission profile. Consequently, if light from such a source is launched directly into a slab region, equal power splitting may not be achieved with either the singlemode or multimode splitters of the prior art.

Whether light is introduced into the slab region via an input waveguide or from an emitter, optical splitters for achieving equal power splitting are not known in the art for the "few-moded" case where the wavefront expanding in the slab region has a multi-peaked shape. In such cases the optical splitter has to be designed specifically, with a distribution of output waveguide widths that complements (i.e. is essentially the inverse of) the intensity distribution of the expanding wavefront.

Figure 6:
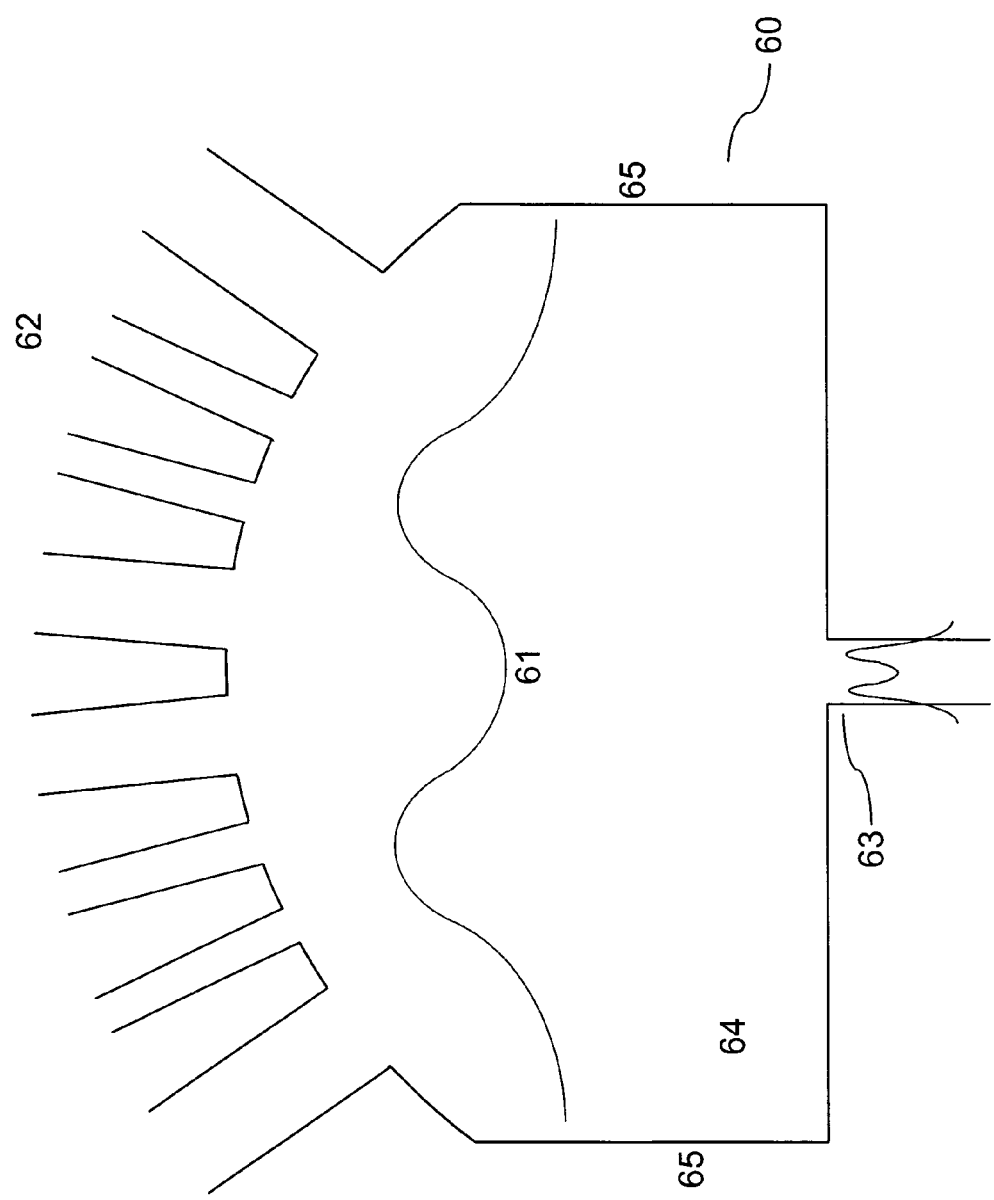
FIG. 6 is a schematic illustration of an optical power splitter for equal power splitting according to a third aspect of the present invention, where the intensity distribution is two-lobed rather than Gaussian.

Accordingly, a third aspect of the present invention is a generalisation of the equal power splitting problem to the case where a multimode input waveguide launches a non-Gaussian (e.g. multi-peaked) beam into a slab region of a 1×N splitter, and where the distribution of output waveguide widths is non-uniform. More specifically, the widths of the output waveguides are chosen such that, when the non-Gaussian beam diffracting in the slab region impinges on the apertures of the output waveguides, the integral of the optical field over the waveguide cross-sectional area is substantially equal for each output waveguide. The output waveguides may be either singlemode or multimode, but are preferably multimode. Preferably, the output waveguides are attached to an arc of a circle centred on the input waveguide, and point towards the input waveguide. FIG. 6 illustrates an example of a 1×8 optical power splitter 60 where the input beam diffracts into a two-lobed intensity distribution 61, and the widths of output waveguides 62 are tailored to complement intensity distribution 61. Such a case may arise for example if the input waveguide 63 supports at least two optical modes. Preferably, slab region 64 should be wider than the array of output waveguides 62 connected thereto, and sufficiently wide such that expanding wavefront 61 does not encounter sidewalls 65. This is to prevent any reflections off the sidewalls that may interfere with and affect the uniformity of the power distribution. Optical power splitters according to the third aspect of the invention may be used advantageously to distribute optical power in waveguide-based optical touch screen sensors, for example in the first or second stage splitting as described above for the first aspect of the present invention.

A fourth aspect of the present invention is another generalisation of the equal splitting problem, to the case where an optical source with a non-Gaussian (e.g. multi-peaked) emission profile launches power directly into the slab region of a splitter, and where the distribution of output waveguide widths is non-uniform. More specifically, the widths of the output waveguides are chosen such that, when the non-Gaussian beam launched into and diffracting in the slab region impinges on the apertures of the output waveguides, the integral of the optical field over the waveguide cross-sectional area is substantially equal for each output waveguide. The output waveguides may be either singlemode or multimode, but are preferably multimode. Preferably, the output waveguides are attached to an arc of a circle centred on the position where the power enters the slab region, and point towards that position. Preferably, the slab region is wider than the array of output waveguides connected thereto, and sufficiently wide such that the expanding wavefront does not encounter the sidewalls of the slab region. This is to prevent any reflections off the sidewalls that may interfere with and affect the uniformity of the power distribution. Optical power splitters according to the fourth aspect of the invention may be used advantageously to distribute optical power in waveguide-based optical touch screen sensors, in the first stage splitting as described above for the second aspect of the present invention.

Figure 7A:
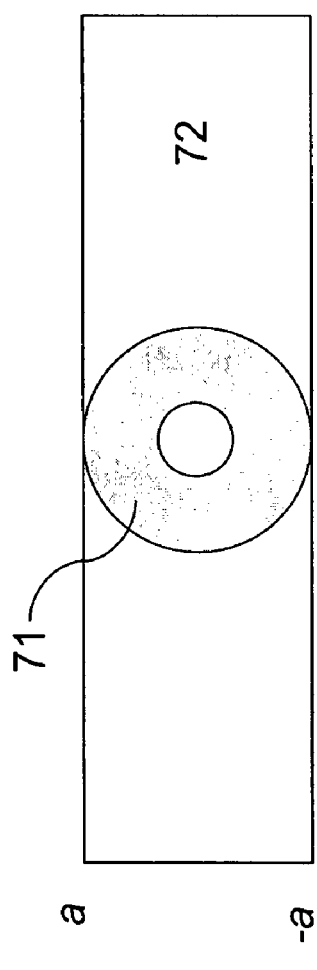
FIG. 7a illustrates the overlap of an annular beam with the end face of a slab region, for launching a substantially uniform intensity distribution into the slab region.
Figure 7B:
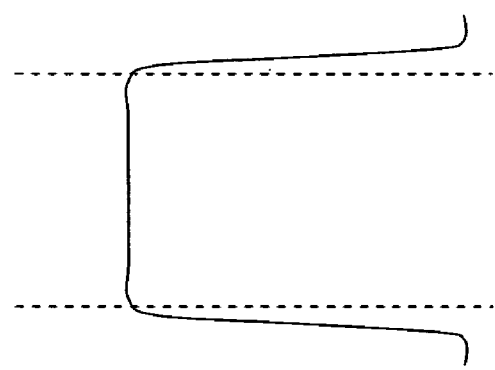
FIG. 7b illustrates a substantially uniform intensity distribution, with the usable portion of total power shown between dotted lines.

A fifth aspect of the present invention addresses a means for launching optical power from an optical source directly into the slab region of a optical power splitter such that it diffracts into an intensity distribution that is substantially uniform in the plane of the slab region. With such an intensity distribution, approximately equal power splitting can be obtained with a uniform array of output waveguides, i.e. there is no need to tailor the configuration of output waveguide widths. It is possible to obtain a desired substantially uniform intensity distribution in a slab region by launching an annular intensity distribution into the slab region. As used herein, the term "annular intensity distribution" includes any transverse intensity distribution that has reduced or very low intensity in a central region and a surrounding region of higher intensity. The radial intensity distribution within the surrounding region may be substantially uniform or may vary. The radial intensity distribution may have a well defined functional form, e.g. that of a $TEM_{01}*$ laser beam as described in U.S. Pat. No. 6,577,799, or it may have a purely phenomenological form arising for example from the gain profile of a laser source. This type of intensity distribution is sometimes referred to as a "doughnut type" distribution. Referring to FIG. 7a, an annular shaped beam of light 71 is projected onto a slab region 72. By correctly choosing the radial intensity distribution of the annular beam, the thickness of the slab region, and/or the positioning of the beam with regard to the slab, the overlap integral of the beam shape with the slab can result in a launched intensity pattern that propagates with increasing width through the slab region in a distribution that is substantially uniform in the plane of the slab region, as illustrated in FIG. 7b. More rigorously, using the (x,y) coordinate system of FIG. 7a, the intensity distribution in the x dimension, P(x), is approximately given by:

$$P(x) = \int_{-a}^{a} I(x, y) dy$$

where I(x,y) is the beam intensity profile and ±a represent the extent of the slab in the y dimension. For an ideal case of FIG. 7a, P(x) is the "top hat" function shown in FIG. 7b. It should be noted that there is no requirement for P(y) to be uniform. That is to say, the intensity distribution perpendicular to the slab region can have any shape so long as each output waveguide receives the same amount of power. It is still necessary to discard the outer edges of the intensity distribution; the dotted lines in FIG. 7b mark the boundaries of the usable fraction. In many practical embodiments, it should be noted that the top of the intensity distribution may not be perfectly flat but have some variation. Certain optical sources can be made to emit light in an annular pattern; VCSELs are particularly advantageous because they have circularly symmetric gain profiles that often intrinsically emit an annular pattern of light. An annular intensity distribution can also be launched into a slab region from a supplementary waveguide, such as an optical fibre, with an annular core. From FIG. 7a it will be appreciated that to obtain the proper overlap it is necessary to correctly align the beam with the slab region in the (x,y) plane. Since optical sources often emit light in a divergent manner (for example in the present case the annular pattern may be expanding), correct placement in the z dimension may also be necessary.

Optical power splitting means according to the fifth aspect of the invention may be used advantageously to distribute optical power in waveguide-based optical touch screen sensors, in the first stage splitting as described above for the second aspect of the present invention.

The optical power splitters and associated waveguide arrays of the present invention can be advantageously fabricated in a cost-effective manner from photo-patternable polymers using a photolithography/wet development process. Photo-patternable polymers are particularly preferred because of the ease and mild conditions (eg. UV exposure followed by solvent development) by which they can be patterned. Examples of photo-patternable polymers include acrylates and siloxanes.

One particularly suitable class of materials is UV curable siloxane polymers, synthesised for example by a condensation reaction as disclosed in the U.S. Pat. Nos. 6,800,724, 6,818,721 and 6,965,006. Siloxane polymers have excellent adhesion to a variety of substrate materials, including silicon, glass and plastics. A photoinitiator or thermal initiator may be added to increase the rate of curing. Examples of commercially available photoinitiators include 1-hydroxy-cyclohexyl-phenyl-ketone (Irgacure 184), 2-methyl-1[4-methylthio)phenyl]-2-morpholinopropan-1-one (Irgacure 907), 2,2-dimethoxy-1,2-diphenylethan-1-one (Irgacure 651), 2-benzyl-2-dimethylamino-1-(4-morpholinophenyl)-butanone-1 (Irgacure 369), 4-(dimethylamino)benzophenone, 2-hydroxy-2-methyl-1-phenyl-propan-1-one (Darocur 1173), benzophenone (Darocur BP), 1-[4-(2-hydroxyethoxy)-phenyl]-2-hydroxy-2-methyl-1-propane-1-one (Irgacure 2959), 4,4'-bis(diethylamino) benzophenone (DEAB), 2-chlorothioxanthone, 2-methylthioxanthone, 2-isopropylthioxanthone, benzoin and 4,4'-dimethoxybenzoin. For curing with visible light, the initiator may for example be camphorquinone. A mixture of two or more photoinitiators may also be used. For example, Irgacure 1000 is a mixture of 80% Darocur 1173 and 20% Irgacure 184. For thermal curing, organic peroxides in the form of peroxides (eg. dibenzoyl peroxide), peroxydicarbonates, peresters (t-butyl perbenzoate), perketals, hydroperoxides, as well as AIBN (azobisisobutyronitrile), may be used as initiators.

Other additives, such as stabilisers, plasticisers, contrast enhancers, dyes or fillers may be added to enhance the properties of the polymer as required.

Fabrication of optical power splitters and associated waveguides according to various aspects of the present invention is described in the following non-limiting examples.

EXAMPLE 1

Figure 9:
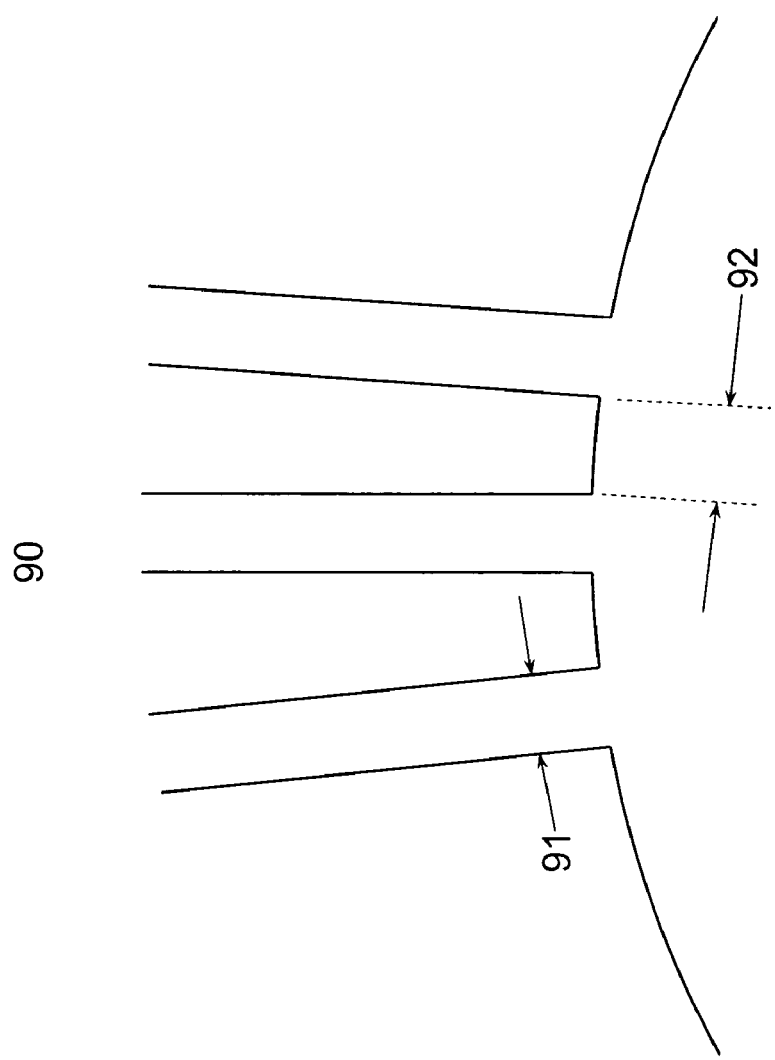
FIG. 9 is an expanded view of a portion of the splitter of FIG. 8, showing three output waveguides emanating from the slab region.

With regard to FIGS. 8 and 9, this example illustrates the fabrication of a 1×120 splitter and its use in a waveguide-based optical touch screen sensor according to the second aspect of the present invention, where the input waveguide has been omitted to enable direct launch into the slab region.

Following the procedure disclosed in U.S. Pat. No. 6,818, 721, a lower refractive index polymer A was prepared with a viscosity of 2500 cP (at 20° C.) and a refractive index (measured at 20° C. on an Abbé refractometer with room light) of 1.483. A higher refractive index polymer B was prepared with a viscosity of 2200 cP (at 20° C.) and a refractive index of 1.509 (at 20° C.). A suitable photoinitiator was added to both polymer A and polymer B.

Polymer A was spin coated onto a silicon wafer and cured with UV light from a mercury lamp, to form a lower cladding layer 20 μm thick and with a refractive index of 1.478 (at 20° C. and 1550 nm). Polymer B was spin coated onto the lower cladding to form a core layer 11 μm thick, and patterned with UV light through a mask. Unexposed polymer B material was then dissolved in isopropanol to leave exposed core material in the form of an optical power splitter 80. Exposed polymer B material had a refractive index of 1.505 (at 20° C. and 1550 nm). Finally, an upper cladding layer was deposited by spin coating and UV curing a second layer of polymer A.

FIG. 8 shows an optical power splitter 80 forming a component of a waveguide-based optical touch screen sensor, according to the second aspect of the present invention. Splitter 80 comprises an input face 86, a slab region 81 and an array of 120 output waveguides represented by outline 82. Slab region 81 has width 83 of 2.45 mm and length 84 of 5.87 mm and ends with a curved face 85 defined by a circular arc centred on the middle of input face 86 and with radius of curvature 6.00 mm. The 120 output waveguides (three of which, marked 90, are shown in FIG. 9) within outline 82 each have width 91 of 8.8 μm and are spaced on a pitch of 15.3 μm (i.e. with gaps 92 of 6.5 μm, designed to prevent gap-filling in the fabrication process). The array of output waveguides 82 occupies an arc length of approximately 1.83 mm within a total arc length 2.47 mm of curved face 85, leaving two portions 87, 88 each of length 0.32 mm. These portions are designed to reject the low intensity wings of the intensity distribution within slab region 81, and to prevent reflection of these wings off the sidewalls. In operation, a VCSEL 89 operating at 850 nm launches light directly into the centre of the input face 86 of slab region 81, whereupon the light diffracts before entering the array of output waveguides 82.

With splitter 80 designed for operation at a wavelength of 850 nm, it will be appreciated by those skilled in the art that the output waveguides are multimode, not singlemode. This can be shown by calculating the waveguide parameter V according to:

$$V = \frac{2\pi}{\lambda} a \sqrt{n_{co}^2 - n_{cl}^2}$$

With the half width of the waveguide core a equal to 5.5 μm, core and cladding refractive indices $n_{co}$ and $n_{cl}$ approximately 1.505 and 1.478 and wavelength λ 850 nm, V is approximately 11.5, significantly greater than unity, indicating that the waveguide is multimode.

EXAMPLE 2

This example illustrates the optical power splitting means according to the fifth aspect of the invention. As described in Example 1, a 1×120 splitter comprising an input face 86, a slab region 81 and an array of 120 output waveguides 82 is fabricated. In this example, optical source 89 is a VCSEL that emits an annular pattern of light, and is aligned with input face 86 such that the light is launched into slab region 81 with an intensity distribution that is substantially uniform in the plane of the slab region. Since the output waveguides 82 all have equal width, substantially uniform splitting of the light is achieved.

EXAMPLE 3

Figure 10:
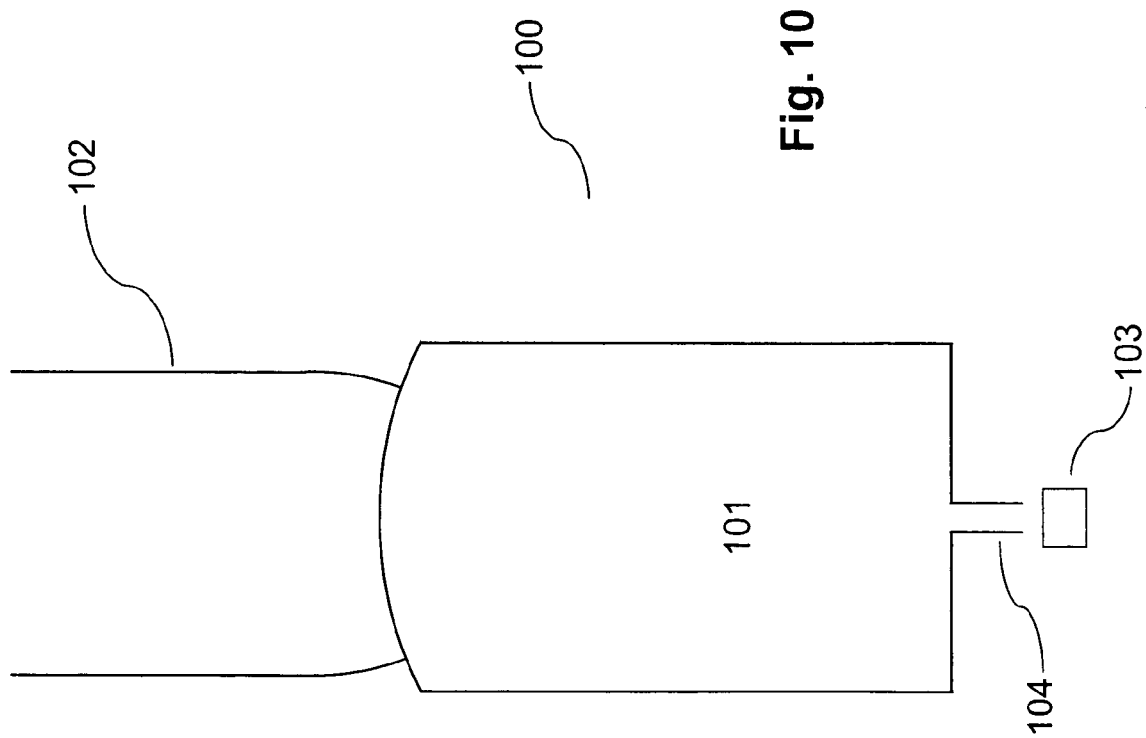
FIG. 10 is a schematic illustration of a 1×120 optical power splitter for use in a waveguide-based optical touch screen sensor according to the first aspect of the present invention.

With regard to FIG. 10, this example illustrates the fabrication of a 1×120 optical power splitter and its use in a waveguide-based optical touch screen sensor according to the first aspect of the present invention. Following the procedure described in Example 1, a 1×120 splitter 100 comprising a multimode input waveguide 104, a slab region 101 and an array of 120 output waveguides 102 is fabricated. Splitter 100 differs from splitter 80 of Example 1 only in that it possesses multimode input waveguide 104, which has the same width (8.8 μm) as each of the output waveguides. Light from VCSEL 103 operating at 850 nm is launched into multimode input waveguide 104, and is distributed to output waveguides 102 as described in Example 1.

EXAMPLE 4

Figure 11:
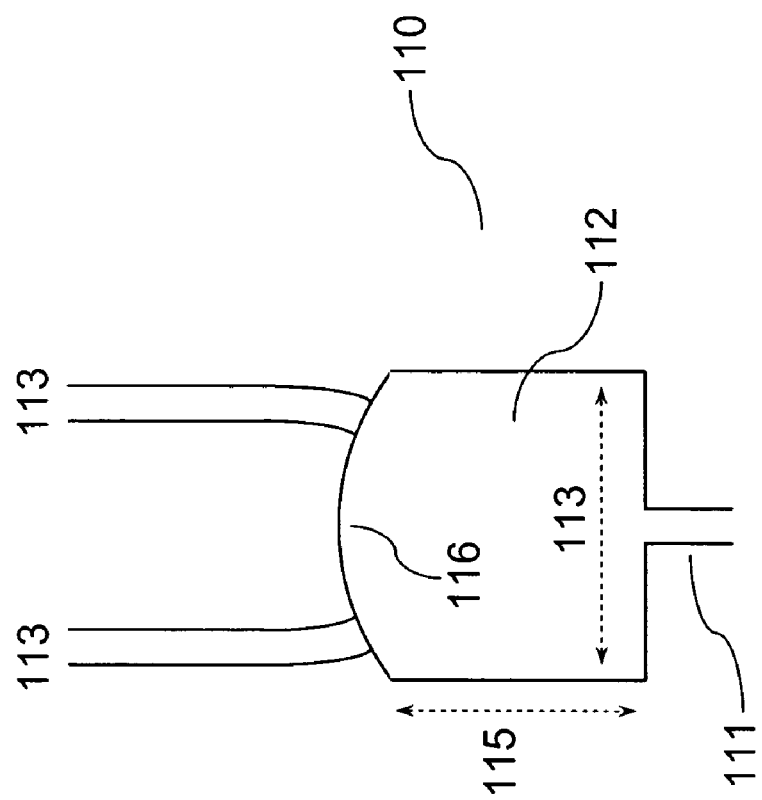
FIG. 11 shows a 1×2 optical power splitter for use in the second stage splitting of a waveguide-based optical touch screen sensor according to the first aspect of the present invention.

With regard to FIG. 11, this example illustrates the fabrication of a 1×2 optical power splitter 110 and its use in a waveguide-based optical touch screen sensor according to the first aspect of the present invention. Specifically, it is used in a second stage of optical power splitting in the transmit side of a waveguide-based optical touch screen sensor. Following the procedure described in Example 1, a 1×2 optical power splitter 110 comprising a multimode input waveguide 111, a slab region 112 and two output waveguides 113 is fabricated. Each waveguide is 8.8 μm in width. Because of the much lower degree of splitting, slab region 112 is much smaller than the corresponding region 81 of Example 1: it has a width 114 of 50 μm, a length 115 of 210 μm and ends with curved face 116 that is an arc of a circle centred on the junction with input waveguide 111.

EXAMPLE 5

Figure 12:
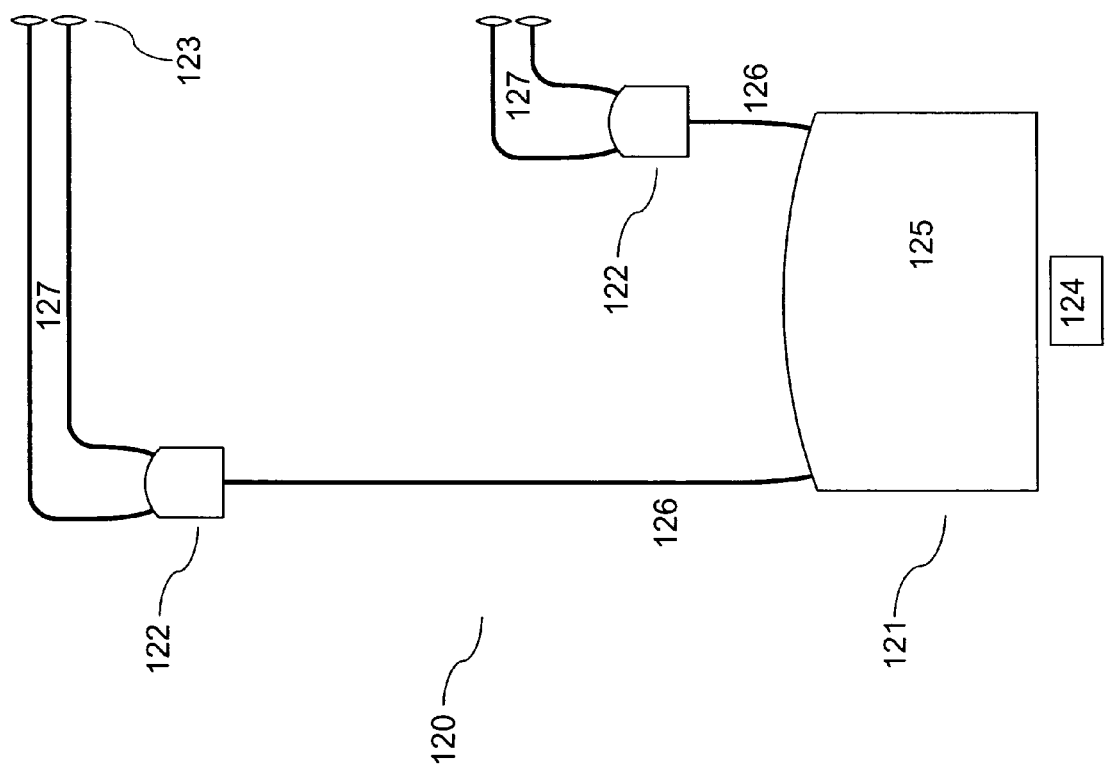
FIG. 12, is a schematic illustration of an optical waveguide layout for use in the transmit side of waveguide-based optical touch screen sensor, incorporating a 1×120 optical power splitter (first stage splitting) in series with an array of 120 1×2 optical power splitters (second stage splitting).

With regard to FIG. 12, this example illustrates the transmit side optical waveguide layout 120 of a waveguide-based optical touch screen sensor, comprising a 1×120 optical power splitter 121 as described in Example 1, an array of 120 1×2 optical power splitters 122 as described in Example 4, and an array of 240 transmit elements 123, with connecting waveguides. Light from an 850 nm VCSEL 124 is launched directly into slab region 125 of 1×120 optical power splitter 121, and is thereby distributed in a first stage of power splitting to 120 waveguides; for clarity only the outermost waveguides 126 are shown. Light guided in each waveguide is fed into a 1×2 optical power splitter 122, and is thereby distributed in a second stage of splitting to waveguides 127 that connect to transmit elements 123.

For the usual case of a rectangular touch screen, the transmit elements 123 as shown in FIG. 12 are arrayed along one side of the touch screen, and will produce a single grid of parallel light beams in say the X direction. A similar optical waveguide layout with a second VCSEL could be arrayed along an adjacent side of the touch screen, to produce a second grid of parallel light beams in the Y direction. Alternatively, waveguides 126 could be divided into two groups following the first stage of power splitting at splitter 121, with each group arrayed along adjacent sides of the touch screen to produce grids of light beams in the X and Y directions.

Although the invention has been described with reference to specific examples, it will be appreciated by those skilled in the art that the invention may be embodied in many other forms.

We claim:

1. An optical power splitter for distributing light from an optical source to a plurality of optical waveguides, the splitter comprising a slab region and an array of output waveguides attached thereto, wherein the optical source launches a substantially annular beam directly into the slab region, and wherein the beam diffracts with an optical field that is substantially uniform in the plane of the slab region such that, when the optical field in the slab region impinges on the output waveguides, the integral of the optical field over the waveguide cross-sectional area is substantially equal for each output waveguide.

2. An optical power splitter according to claim 1, wherein the optical source is a laser with an annular emission profile, a light emitting diode with an annular emission profile or a waveguide with an annular core.

3. An optical power splitter according to claim 2, wherein the waveguide is an optical fibre or an integrated optical waveguide.

4. An optical power splitter according to claim 3, wherein the waveguide is an output waveguide of an optical power splitter, thereby to define a multi-stage splitter system.

5. An optical power splitter according to claim 1, when used as a component of an optical touch screen sensor.

6. An optical power splitter according to claim 1, wherein at least one of the output waveguides serves as the optical source for a second optical splitter, thereby to define a multi-stage splitter system.

7. An apparatus for distributing optical power to an edge of a input area, to produce a plurality of optical beams for sensing touch input on said input area, the apparatus comprising:
   an optical source; and
   at least one optical power splitter for distributing light from the optical source to a plurality of output waveguides, each splitter comprising a slab region and an array of output waveguides attached thereto, wherein the optical source launches a substantially annular beam directly into the slab region, and wherein the beam diffracts with an optical field that is substantially uniform in the plane of the slab region such that, when the optical field in the slab region impinges on the output waveguides, the integral of the optical field over the waveguide cross-sectional area is substantially equal for each output waveguide.

8. An apparatus according to claim 7, wherein the optical source is a laser with an annular emission profile, a light emitting diode with an annular emission profile or a waveguide with an annular core.

9. An apparatus according to claim 8, wherein the waveguide is an optical fibre or an integrated optical waveguide.

10. An apparatus according to claim 9, wherein the waveguide is an output waveguide of an optical power splitter, thereby to define a multi-stage splitter system.

11. An apparatus according to claim 7, wherein at least one of the output waveguides serves as the optical source for a second optical splitter, thereby to define a multi-stage splitter system.

* * * * *